United States Patent [19]

Grebe et al.

[11] 4,061,906

[45] Dec. 6, 1977

[54] COMPUTER FOR NUMERIC CALCULATION OF A PLURALITY OF FUNCTIONALLY INTERRELATED DATA UNITS

[76] Inventors: Wolfgang Grebe, Enzianweg 10, Starnberg; Siegfried Buhlmann, Hubertusstrasse 10, Neugermering, both of Germany

[21] Appl. No.: 680,197

[22] Filed: Apr. 26, 1976

[30] Foreign Application Priority Data

Apr. 28, 1975 Germany ............................ 2518887

[51] Int. Cl.² ............................................. G06F 15/32
[52] U.S. Cl. ..................................... 364/735; 364/200
[58] Field of Search ...................... 235/152, 180, 156; 340/172.5

[56] References Cited

U.S. PATENT DOCUMENTS

| | | | |
|---|---|---|---|
| 3,226,688 | 12/1965 | Amdahl et al. ................... | 235/152 X |
| 3,308,436 | 3/1967 | Borck, Jr. et al. ................ | 340/172.5 |
| 3,364,472 | 1/1968 | Sloper ............................... | 340/172.5 |
| 3,582,899 | 6/1971 | Semmelhaack ................... | 340/172.5 |
| 3,979,728 | 9/1976 | Reddaway ........................ | 340/172.5 |

*Primary Examiner*—David H. Malzahn
*Attorney, Agent, or Firm*—Brumbaugh, Graves, Donohue & Raymond

[57] ABSTRACT

A computer for numeric calculation of a plurality of functionally interrelated data units, each data unit corresponding to a point of a grid. The computer includes a cyclic memory having at least as many storage cells as the grid has grid points. Each storage cell includes a first memory location for storing a corresponding grid point data unit and a second memory location for storing a code associated with the grid point data unit stored in the first memory location. The code contains information for controlling and processing the grid point data unit stored in the first memory location. A new grid point data unit is calculated for the grid point corresponding to a preselected storage cell by a computing circuit which uses mathematical operations involving data units associated with grid points adjacent the grid point corresponding to the preselected storage cell.

11 Claims, 10 Drawing Figures

(1) $$\frac{\partial^2 \varphi}{\partial x^2} + \frac{\partial^2 \varphi}{\partial y^2} = 0$$

(2) $$\varphi_{i-1,j} - 2\varphi_{i,j} + \varphi_{i+1,j} + \varphi_{i,j-1} - 2\varphi_{i,j} + \varphi_{i,j+1} = 0$$

(3) $$\varphi_{i,j} = \frac{\varphi_{i-1,j} + \varphi_{i+1,j} + \varphi_{i,j-1} + \varphi_{i,j+1}}{4}$$

ns involved in the solution of such systems of equations lie in the universality of electronic computers. Accordingly, computers have been incapable, heretofore, of achieving rapid, simultaneous calculation of a considerable number of data units related to each other by some functional relationship and, thus, could not solve, within a satisfactory time, the above-identified problems.

COMPUTER FOR NUMERIC CALCULATION OF A PLURALITY OF FUNCTIONALLY INTERRELATED DATA UNITS

BACKGROUND OF THE INVENTION

The present invention relates essentially to a computer for numeric calculation of a plurality of functionally interrelated data for a plurality of points, forming a grid in rows and columns, of a domain with preassigned initial or boundary conditions, by iterative interpolation on the values of adjacent points of the grid. Such computers may be used, for example, to approximate solutions of an ordinary or partial differential equation or system of such differential equations. Moreover, the computers may be employed for solving other problems in which a plurality of functionally interrelated data are to be calculated, such as so-called Monte Carlo problems, problems in economics, and the like.

Heretofore, there have been no analytical methods for solving differential equations, and, more particularly, partial differential equations, for boundary conditions and initial values of any complexity. It has been necessary, therefore, to resort to numerical approximation, based generally on the idea of converting a differential equation into difference equations. Geometrically, this amounts to replacing the tangent at the coordinate point by the secant. It may also be interpreted as replacing a Taylor expansion at the coordinate point by its first term.

When systems comprising a number of equations are to be solved, exact methods are not available because the unavoidable rounding off errors will build up and the numerical solution will diverge. In practice, systems comprising a number of differential equations are often solved by iterative methods, i.e., methods of "relaxation", such as the Jacobi whole-step method, the Gauss-Seidel single-step method, and the step-by-step hyperrelaxation method. Disadvantages of these methods are their slow convergence and consequently, long computer time. Even calculating the solutions for the grid points of a 50 × 50-point matrix of a domain will require several hours of computer time on fast computers for a differential equation of even moderately complicated structure.

In natural science and engineering there are a number of problems which depend almost entirely on numerical solutions of differential equations. Examples include problems involving potential and wave equations in electrical engineering, stress analysis in machine design and construction work, the Navier-Stokes equations in fluid transfer, equations for transfer of matter in process engineering, heat conduction and diffusion in thermodynamics, and long-term, wide-area weather forecasting in meteorology. In the field of physics, furthermore, a sub-branch has evolved that likewise employs the above-mentioned methods among others, and has been termed "computational physics".

The reasons for the comparatively long computation times involved in the solution of such systems of equations lie in the universality of electronic computers. Accordingly, computers have been incapable, heretofore, of achieving rapid, simultaneous calculation of a considerable number of data units related to each other by some functional relationship and, thus, could not solve, within a satisfactory time, the above-identified problems.

SUMMARY OF THE INVENTION

It is an object of the present invention to provide a computer which avoids the difficulties and disadvantages of the prior art computers described above.

This object, as well as other objects which will become apparent in the discussion that follows, are achieved, according to the present invention, in a computer for numeric calculation of a plurality of functionally interrelated data units, each data unit corresponding to a point of a grid, which is arranged in rows and columns and covers a domain of solutions, using mathematical operations involving data units associated with grid points ajacent a preselected grid point. The computer includes a cyclic memory having at least as many storage cells as the grid has grid points; means for storing information in at least one of the storage cells; shifting means for cyclically shifting cell-by-cell the information containing in the storage cells; a plurality of computing means, each computing means capable of being connected to more than one storage cell; and means for retrieving information from the cyclic memory when a calculation has been carried out.

The term "data" is used in the broad sense to refer to both numbers and symbols, and groups of numbers and/or symbols. Thus, a data unit may consist of one or more machine words, each machine word corresponding generally to a multiplace binary number containing a plurality of bits.

In accordance with the present invention, each storage cell includes a first memory location for storing the corresponding grid point data unit and a second memory location for storing a code associated with the grid point data unit stored in the first memory location, the code containing information for controlling and processing the grid point data unit stored in the first memory location. Each computing means is connected to a respective preselected storage cell and the storage cells storing simultaneously, at a predetermined time of each complete shift cycle, the grid point data units of grid points adjacent, in row and column direction of the grid, the grid point corresponding to said respective preselected storage cell at the predetermined time. Furthermore, each computing means is capable of being controlled by the code stored in the second memory location of said respective preselected storage cell, and calculating a new grid point data unit for the grid point corresponding to said respective preselected storage cell using the grid point data units of the adjacent grid points.

The computer of the present invention is capable of performing simultaneously a fairly large number of computing operations without interference between them, and with very little expenditure of time for memory access and similar incidental memory operations. Thus, little machine time is required even for calculating a great many data. The computer of the present invention is also advantageous because of its comparatively simple structure, which makes it possible to use integrated circuits, and high adaptability to a wide variety of problems.

In accordance with another feature of the present invention, each code is provided with at least one labeling bit place for boundary value information specifying whether or not the grid point data unit is associated with a grid point located inside the domain of solution. Each grid point data unit stored in said respective peselected storage cell is replaced by the new grid point data unit only when the boundary value information indicates that the grid point corresponding to said respective preselected storage cell lies within the domain of solution. In accordance with this feature, the computer may be especially adapted for solving boundary value problems.

In order to calculate the new grid point data unit, each computing means may be provided with a plurality of multipliers. A decoding unit receives the code stored in the second memory location of one of said respective preselected storage cells and generates coefficient signals when the code is received by the decoding unit. By decoding the code, the decoding unit may also generate a switching signal.

The computer may be provided also with a plurality of auxiliary shift registers, each auxiliary shift register being connected to the first memory location of one of the preselected storage cells. Each auxiliary shift register includes at least as many storage cells as the number of storage cells of the cyclic memory between said one of the preselected storage cells and the following preselected storage cell in the direction of shift. In this way, every storage cell of each auxiliary shift register corresponds to a storage cell of the cyclic memory. A pair of switch means is associated with each auxiliary shift register.

Besides being connected to said respective peselected storage cell and the storage cells immediately adjacent thereto, each computing means can be connected to the storage cells for the two grid points most nearly adjacent, in each row and column direction, the grid point corresponding to said respective preselected storage cell. Furthermore, each computing means may be connected to the storage cells for the grid points diagonally adjacent the grid point corresponding to said respective preselected storage cell.

For three-dimensional problems, each computing means may be connected to a corresponding storage cell in two other shift registers. For n-dimensional problems, the cyclic memory is provided with an equivalent storage cell dimension for each dimension of the problem, and the computing means of each preselected storage cell is connected to at least two storage cells for grid points which are adjacent, in the direction of the dimension of the problem, the grid point corresponding to said respective preselected storage cell.

BRIEF DESCRIPTION OF THE DRAWING

For a further understanding of the present invention, reference may be had to the accompanying drawing, in which.

DESCRIPTION OF THE PREFERRED EMBODIMENTS

Figure 1:
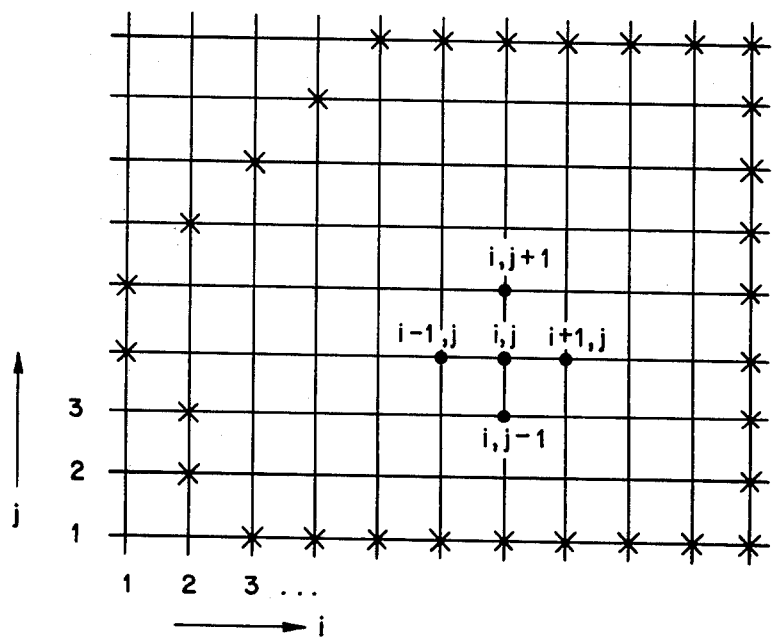
FIG. 1 is a graphical representation of a grid matrix of a domain of solutions.

Referring now to FIG. 1, there is shown a coordinate grid with columns $i$ and rows $j$ defining points $i, j$ of the grid. Assume, for example, that the values of the solution of the potential or Laplacean equation (1) given below FIG. 1 are to be calculated for a domain hose boundary points are indicated by the symbols "$x$". The values at the boundary points are preassigned, being calculated, for example, by an electronic computer in conventional manner. To solve the equation, the values of the points of the grid within the domain delimited by the boundary values must be calculated. The problem, in other words, is a boundary value problem.

According to equations (2) and (3) given below FIG. 1, the value at a point $i, j$ is the arithmetic mean of the values at the four adjacent points $i, j + 1$; $- l, j$; $+ l, j$; and $i, j - l$. From the preassigned boundary values, the solutions of the differential equations can be calculated iteratively for the points located inside the domain (Dirichlet"s problem).

Figure 2:
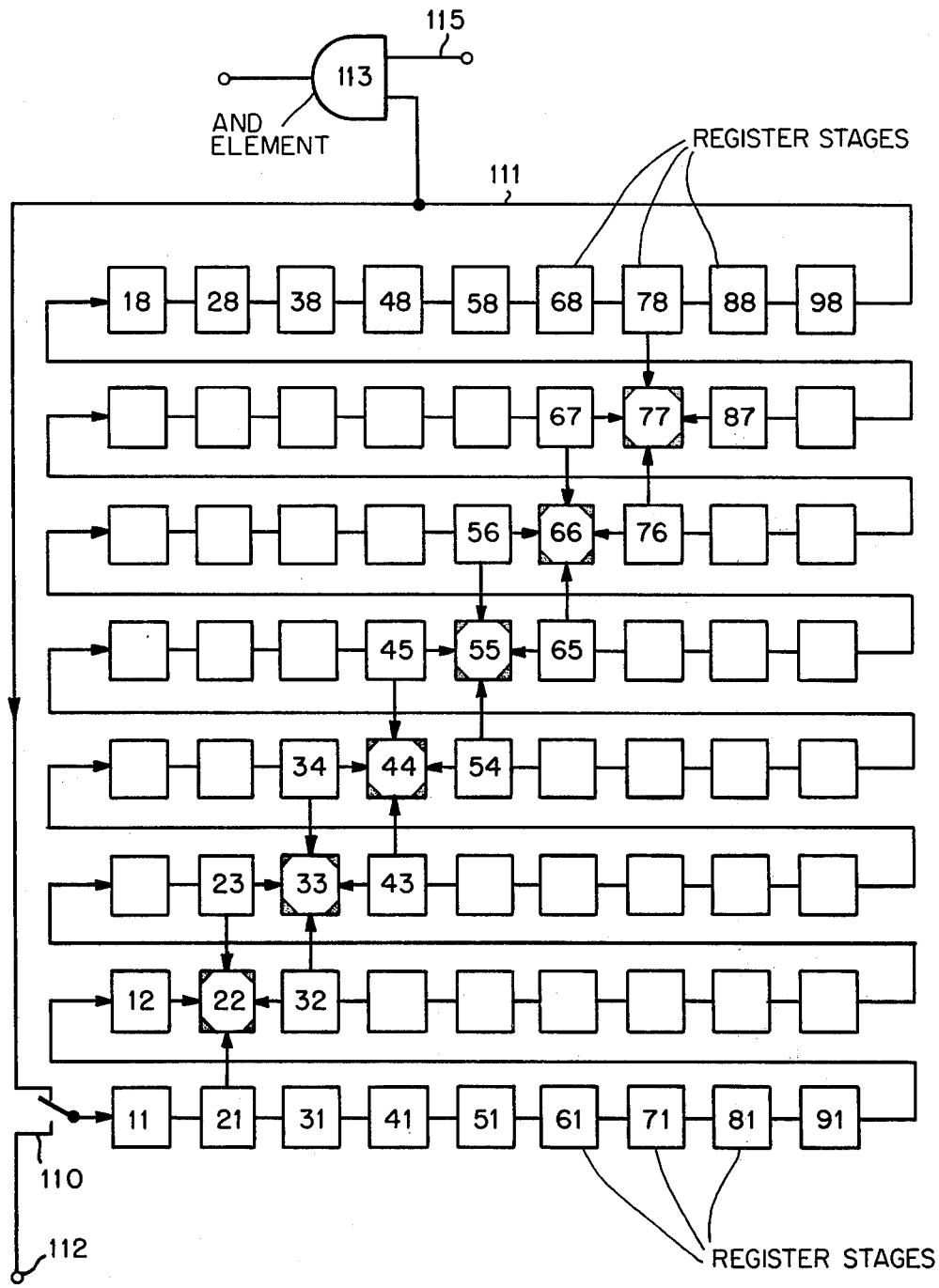
FIG. 2 is a simplified block diagram of an embodiment of a computer in accordance with the present invention.

In FIG. 2, there is shown a simplified embodiment of a calculating device for carrying out the calculations explained with reference to FIG. 1 quickly and with no additional overhead outlay. The calculating device includes a shift register having at least as many register stages as there are points in a rectangular grid covering the domain of solutions. In this manner, the grid points of the domain of solutions. In this manner, the grid points of the domain can be "mapped" one-to-one on corresponding register stages. In practice, as a rule, the number of register stages in the calculating device and their arrangement in rows and columns are preassigned, in which case the grid for the domain in question will be chosen for optimum utilization of the register.

In FIG. 2, the register stages are marked 11 to 98, the first digit being in each case the column number $i$ and the second digit the row number $j$. The register stages are concatenated so that the data units stored in the plurality of stages will shift cyclically through the entire register. The data units keep shifting along the rows, until they reach the last stage of each row. Since the last stage of each row is linked to the first stage of the next row, the data units shift from one row to the next. The last stage 98 of the top row is linked by a line 111 to the first stage 11 of the bottom row. In conventional manner, each stage is provided with means (not shown) for supplying shift pulses or pulse sequences.

A switch 110, having a pair of inputs, is connected between the stages 98 and 11. One input of the switch 110 is connected to the output of the stage 98. The other input 112 serves for initial storage of the initial or boundary values, as well as additional information, i.e., codes, associated with the initial or boundary values, in the register, and may in practice be connected, for example, to an electronic computer. The switch 110 also includes an output which is connected to the input of the stage 11. In boundary value and initial value problems, approximations or estimates, of any degree of inaccuracy, for the required grid values in the interior of the domain are also stored.

To permit retrieval of the calculated data from the shift register comprising the register stages, after termination of the computational operation, the line 111 is connected to one input of the AND element 113. The other input 115 of the AND element is adapted to receive a read-out order. The read-out order may be generated, for example, by an electronic data processing system (not shown in FIG. 2, but see 109 in FIGS. 4 and 5) which may also be connected to the output of the AND element 113, whereby the data calculated can be printed out or otherwise processed and/or delivered by the electronic data processing system.

As shown in FIG. 2, register stages 22, 33, 44, 55, 66 and 77 differ from the other stages in that each is provided with a computing means. Each computing means is connected to four adjacent stages, in row and column direction, as indicated by the arrows in FIG. 2.

Depending upon the accuracy with which the numerical approximation, i.e., the difference equation, is constructed, additional adjacent stages may be connected to each computing means for calculating, for example, a grid value corresponding to the second terms of a Taylor series, or mixed derivatives. Thus, the two most nearly adjacent stages, in each row and column direction, may be connected to each computing means. Also, each computing means may be connected to diagonally adjacent stages or, optionally, the two most nearly diagonally adjacent stages in each diagonal direction.

Figure 3:
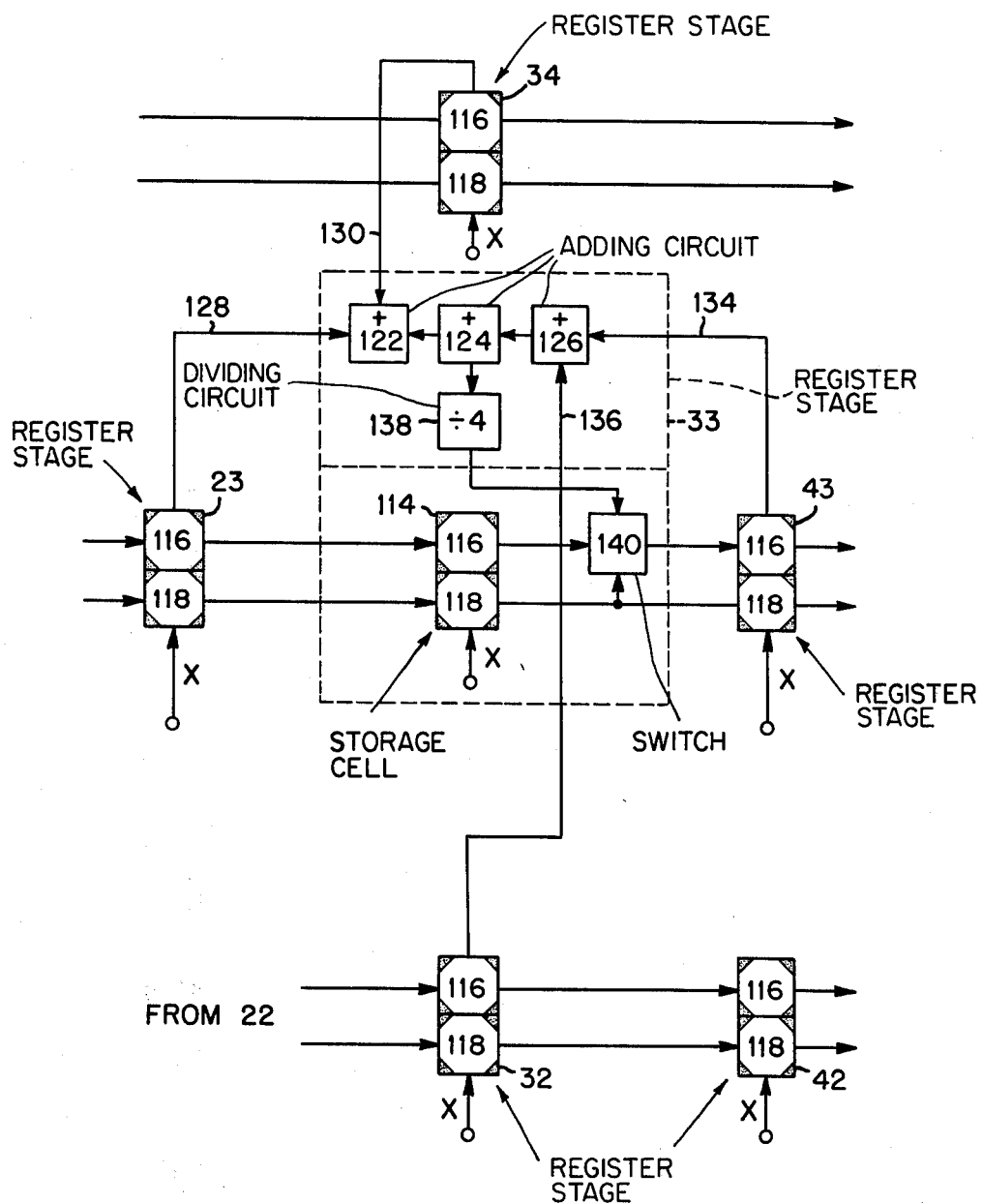
FIG. 3 is a more detailed block diagram of a portion of the computer of FIG. 2.

Referring now to FIG. 3, the design of the register stages provided with the computing means will be described with reference to the stage 33. As shown, the stage 33 includes a storage cell 114 similar to the stages which are not provided with computing means and, like them, having one memory location 116 for a grid point data unit and another memory location 118 for a labeling number. The labeling number contains at least one place for a bit specifying whether or not the corresponding grid value in the memory location 16 is a boundary value.

The computing means comprises three adding circuits 122, 124 and 126. The adding circuit 122 has two data inputs 128 and 130 and an output connected to one of the two inputs of the adding circuit 124. The other input of the adding circuit 124 is connected to the output of the adding circuit 126, which also has two data inputs 134 and 136.

The data inputs 128 and 130 of the adding circuit 122 are connected to the memory locations 116 of register stages 23 and 34, respectively. Correspondingly, the data inputs 134 and 136 of the adding circuit 126 are connected to the memory locations 116 of register stages 43 and 32, respectively.

The output of the adding circuit 124 is connected by way of dividing circuit 138, having a divisor of four, to one of two inputs of a multiplexer or switch 140. The other input of the switch 140 is connected to the memory location 116 of the storage cell 114 of the register stage 33. The switch 140 also has an input connected to the memory location 118 of the storage cell 114 of the register stage 33. The output of the switch 140 leads to the memory location 116 of the following register step 43.

Figure 3A:
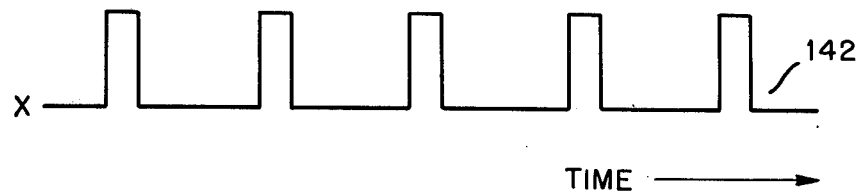
FIG. 3a is a timing diagram illustrating pulses which are to be applied to the terminals "x" of the circuit of FIG. 3.

In operation, all the register stages are supplied by way of shift pulse terminals "x" with periodic shift pulses 142, as shown in FIG. 3a, which, in conventional manner, cause the information stored in any register stage, for example the stage 32, to be shifted into the following stage, for example the stage 42. The ading circuits 122 and 126 form the sum of the values supplied by the data inputs 128, 130 and 134, 136, respectively. These sums are then added by the adding circuit 124. The total thus derived from the grid values of the four adjacent register stages 23, 32, 34 and 43 is divided by a divisor of four in the dividing circuit 138, so that the mean of the four adjacent values is available at the output of the dividing circuit 138.

The boundary value bit stored in the memory locations 118 has a value of zero when the grid value in quesion is a boundary value. For grid points inside the domain of solution, the value of the boundary value bit is one.

Accordingly, if a boundary value is stored in the memory location 116 of the storage cell 115 of the register stage 33, the bit at the input of switch 140 is zero, so that the switch 140 links the memory location 116 of the storage cell 114 of the register stage 33 to the memory location 116 of the register stage 43. The boundary value stored in the memory location 116 of the storage cell 114 of the register stage 33 is, therefore, shifted into the memory location 116 of the register stage 43 at the next shift, without change. However, if the value in question is that of an ordinary grid point, the bit of value one at the input of the switch 140 will set the switch 140 so that it connects the output of the dividing circuit 138 with the memory location 116 of the storage cell 114 of the register stage 33 so that the calculated mean, rather than the value previously shifted over from the stage 23, is stored. At the next shift, the mean calculated in the manner described above is shifted over to the memory location 116 of the next register stage 43.

The averaging and recalculation of a grid value takes place after each shift, and simultaneously in all the register stages 22, 23, 44, 55, 66 and 77 which are provided with computing means. This simultaneous processing and the fact that there is no overhead work, such as memory retrieval, to be done between computations result in a very short total computation time.

Referring again to FIG. 2, the register stages provided with computing means are offset in row and column direction from each other in such a manner that no stage having an associated computing means receives grid values required for averaging from any other stage having a computing means. This avoids any mutual influence of the computing operation. Alternatively, such mutual influence may be avoided by interposition of buffer memories or by time staggering the computing operations of the interconnected stages.

It will be apparent that, with the cyclic shifting of the grid values, the register system of FIG. 2 ensures that the register stages adjacent a stage having a computing means will contain values for grid points adjacent the grid point stored in the register stage having the computing means. The grid points at the boundary of the grid are an exception. But since the boundary value bit for these points has a value of zero (0), grid values for these points do not change, and shelter the points inside the solution grid nonadjacent points and values located outside the grid.

For domains of solution with a large number of grid points, the calculating device of FIG. 2 also requires a correspondingly large number of register stages. This results in an increase in the outlay of equipment. However, by replacing some of the register stages by other types of storage devices (see FIGS. 4 and 5), the number of register stages may be decreased.

Figure 4:
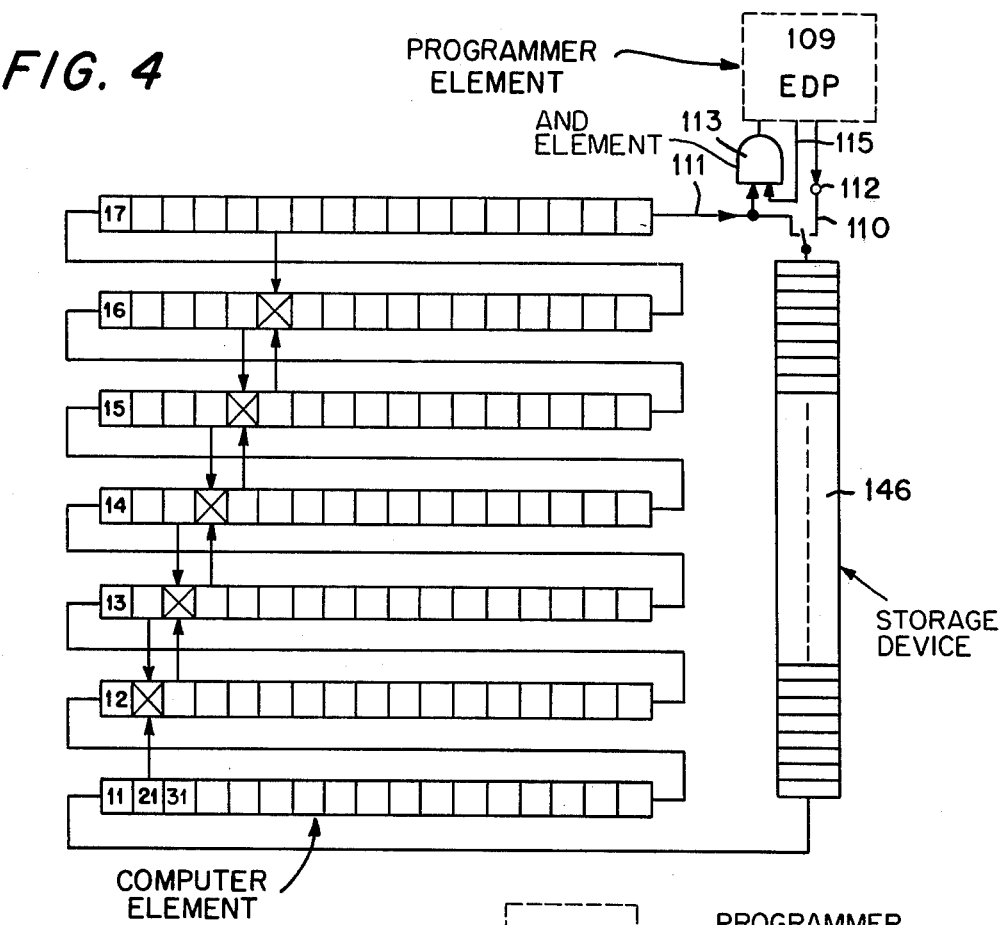
FIGS. 4 and 5 are simplified block diagrams of alternate embodiments of the present invention.

As shown in FIG. 4, for example, only some of the rows of register stages are of the type described with reference to FIG. 2. The remaining rows are replaced by a storage device 146 containing at least as many locations as the number of register stages replaced. The storage device 146 may be a simple shift register having a correspondingly large number of stages, a suitably organized magnetic core memory with random access, or some other static memory. Alternatively, a dynamic memory may be used, such as an ultrasonic memory with a delay line. The function of the storage device 146 may also be assumed by the storage means of the electronic data processing system 109.

Figure 5:
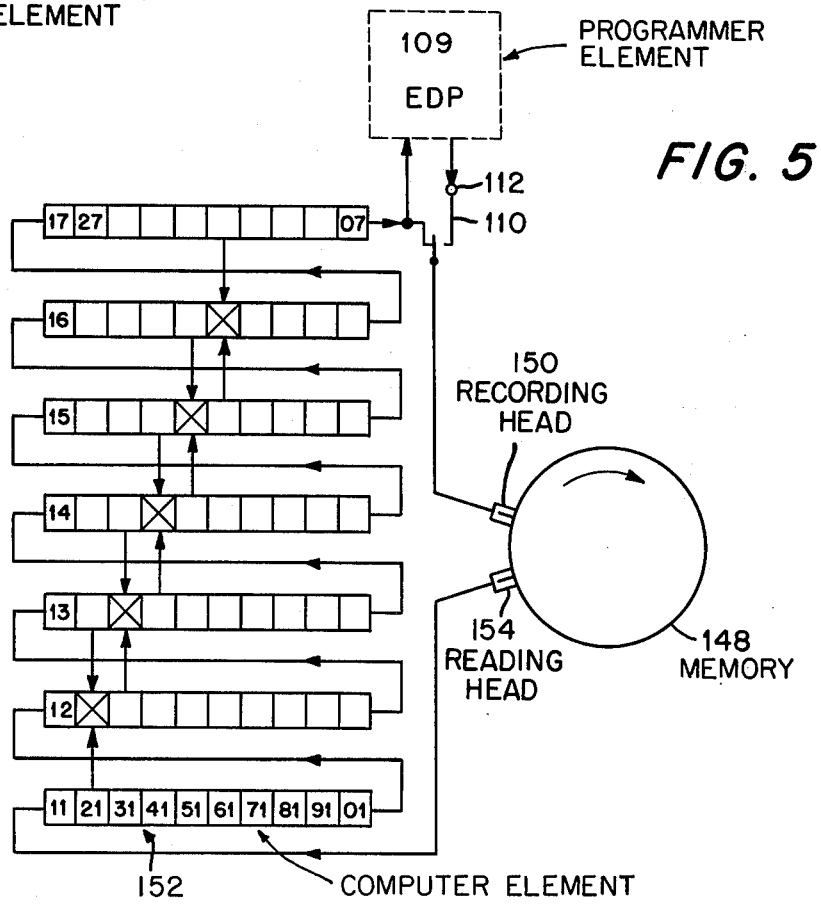

In FIG. 5, some of the rows of register stages are replaced by a magnetic drum, tape or disc memory 148. The disc memory has a recording head 150 connected to the last step 07 of a shift register 152 similar to the shift register of FIG. 2. Additionally, the disc memory 148 has a reading head 154 connected to the first stage 11 of the shift register 152.

The labeling numbers stored in the memory locations 118 may be used for other purposes besides identification of boundary values and values outside the domain of solution. For example, the labeling numbers may define the weight of the corresponding grid value, and-/or influence the computing means in any desired manner.

The operational mode of the computing means may also be made dependent on the magnitude of the particular grid value. This is especially useful when the coefficients of the differential equation to be solved depend on the value of the solution, such as for the equation of heat conduction when the thermal conductivity is a function of temperature, or when phase changes, e.g., fusion, take place at certain temperatures.

Figure 6:
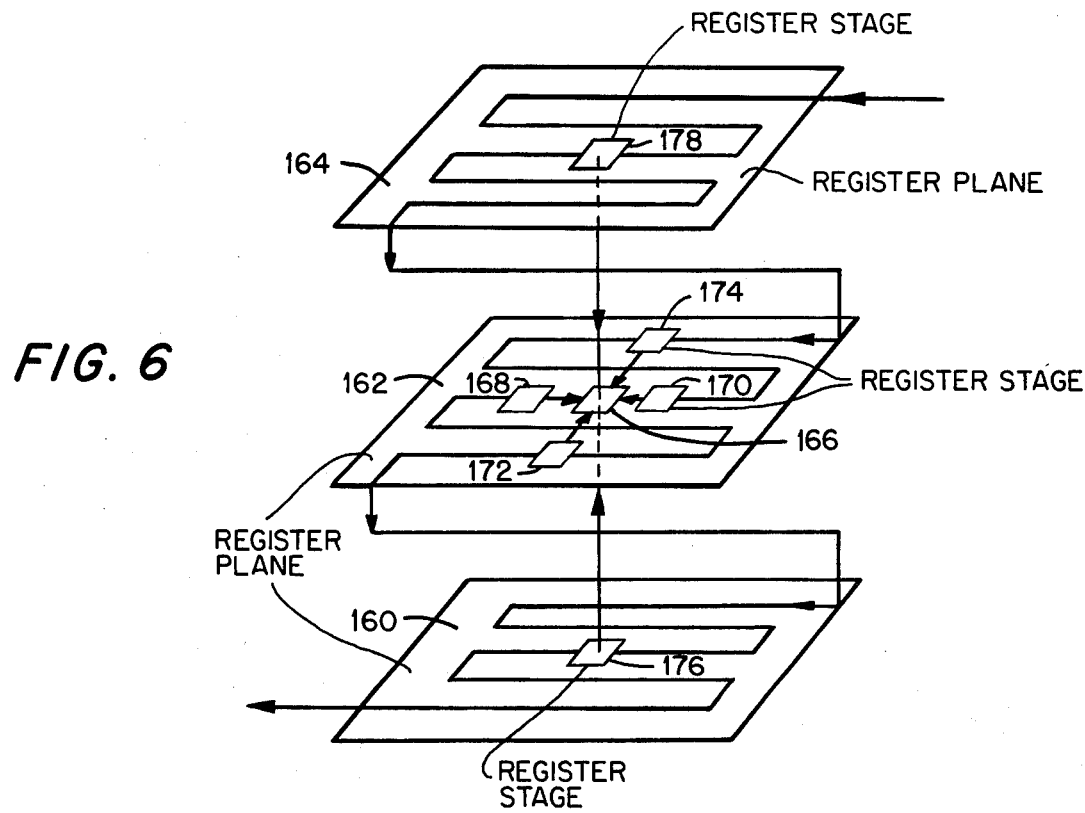
FIG. 6 is a schematic diagram of an alternate embodiment of the present invention used for three-dimensional problems.

The computer of the present invention is especially adapted to solve differential equations pertaining to two-dimensional problems. However, the invention may be extended to three-dimensional problems, without difficulty. In that case, as illustrated in FIG. 6, several register planes 160, 162 and 164 are superposed, and the register stages with computer means are additionally connected to the corresponding stages of the planes below and above the register plane in question, so that the means of six adjacent grid values are computed at the same time. For example, a register stage 166 in the plane 162 is connected not only to four adjacent stages 168, 170 172 and 174 in the same plane, but also to the adjacent stages 176, 178 in each of the adjacent planes 160 and 164, respectively.

Figure 7:
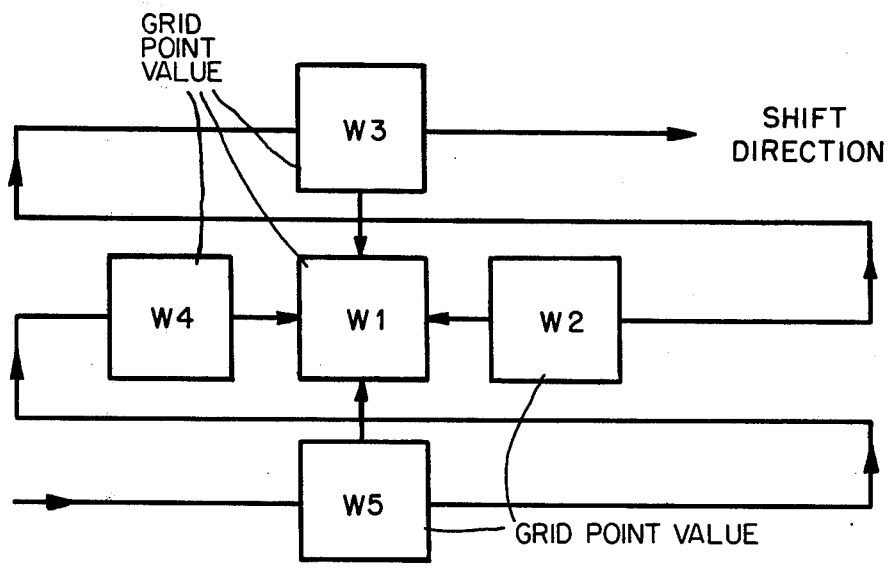
FIG. 7 is a block diagram of a computation stage and its adjacent stages.

To explain how variations of the coefficients involved in a difference equation may be accounted for how initial value problems may be solved, consider the simple case where a preassigned grid point value W1 (see FIG. 7) is derived from four adjacent values W2, W3, W4, W5. Generally, the equations to be processed are iterative and of the type:

$$W1_n = k1\ W1_a + k2\ W2_a + k3\ W3_{a+} k4\ W4_a + k5\ W5_a,$$

where $k1, k2, k3, k4$ and $k5$ are the respective coefficients of the values $W1_a, W2_a, W3_a, W4_a$ and $W5_a$ in the newly calculated value $W1_a$, and wherein the subscript "$n$" refers to a newly calculated value and the subscript "$a$" to a starting value, i.e., a value taken as a starting point in calculating a new value.

In boundary value problems, new values can be used for W2 and W3, i.e., values which, unlike the values W4 and W5, were newly calculated in the preceding step (Gauss-Seidel method). In initial value problems, to the contrary, the values W1, W2, W3, W4 and W5 must all have gone through the same number of computing or processing operations, i.e., they must all have been old values.

Figure 8:
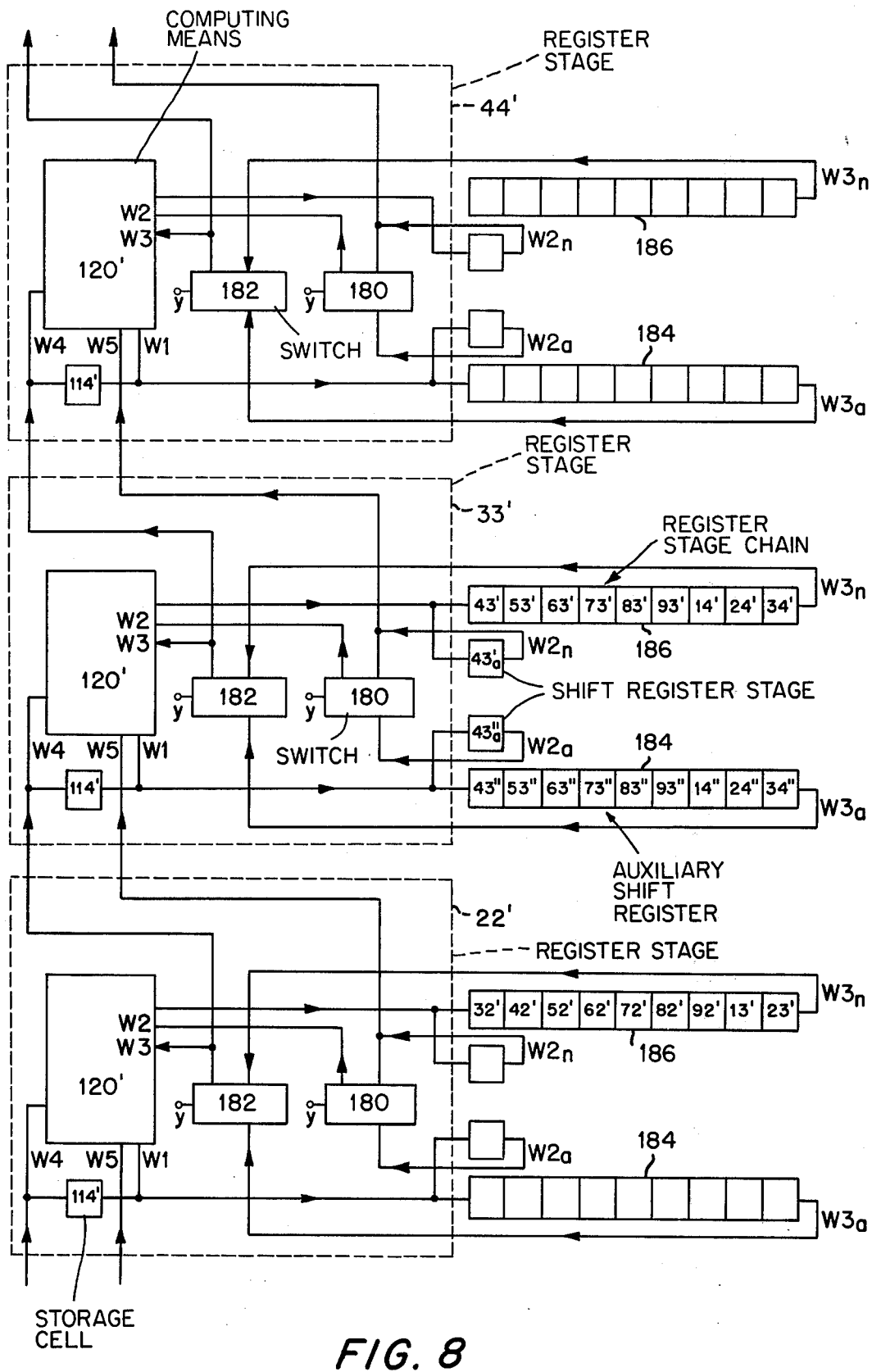
FIG. 8 is a simplified block diagram of a portion of another embodiment of a computer in accordance with the present invention.
Figure 9:
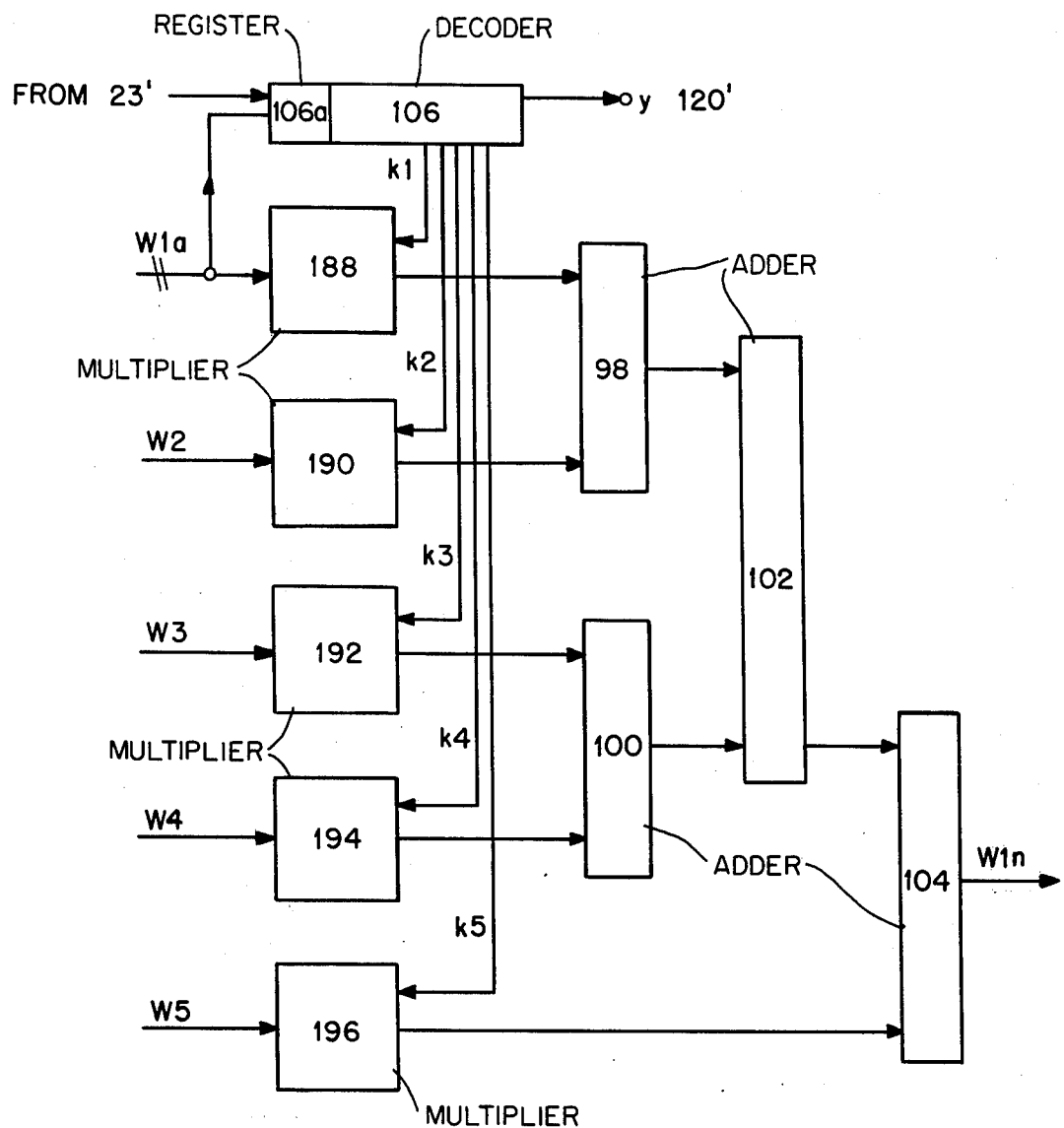
FIG. 9 is a block diagram of a computing means suitable for use, in particular, with the computer of FIG. 8.

FIGS. 8 and 9 illustrate a modified computer capable of varying coefficients and solving both initial and boundary value problems. In FIG. 8, there is shown that portion of the modified computer which corresponds to the portion of the calculating device of FIG. 2 which contains the stages 32, 42, 52, 62, 72, 82, 92, 13, 23, 33, 43, 53, 63, 73, 83, 93, 14, 24 and 34, i.e., the portion of the register including and surrounding the register stage 33 provided with a computing means. Corresponding parts are marked with the same reference numerals as in FIGS. 2 and 3, with a prime suffixed. As to the register stages, it is assumed that the data unit at the input is shifted to the proper stage whenever a timing signal or shift pulse is generated, and that between shifts the stored data unit is available at the output of the stage in question.

The register stage 33' contains a storage cell 114' and a computing means 120'. The computing means 120' is connected to the outputs of the storage cell 114' of the register stage 33', the stages immediately preceding and immediately following the register stage 33', and the stages which are adjacent, in column direction, the register stage 33'. However, the connection of the computing means 120' to the stages following the register stage 33' in the direction of shift is not direct but by way of switches 180 and 182. Furthermore, the stage 33' is associated with an auxiliary shift register 184 whose first stage 43' is connected to the output of the storage cell 114' of the register stage 33', and which, therefore, picks up the old values in time with the shift. The auxiliary register 184 extends as far as to a step 34" connected to one output of the switch 182 and supplying the old value $W3_a$ to it. The other input of the switch 182 receives the new value $W3_n$ from the stage 34' of a chain of register stages 186, which was described previously with reference to FIG. 2.

It may be assumed that the stages 43', 53', 63', 73', 83', 93', 14', 24' and 34' adjoining the computing means 120' are formed by an integrated circuit in which the outputs of the stages, except for the output of the last stage, are not assccessible from the outside. Hence the first stage 43' holding the new value $W2_n$ is arranged in parallel with a single shift register stage 43'a from the output of which the values $W2_n$ are supplied to one input of the switch 180. Correspondingly, the first stage 43" of the auxiliary shift register 184 is arranged in parallel with a single shift register stage 43"a storing the old value $W2_a$, its output being connected to the other input of the switch 180. Accordingly, if an initial value or a boundary value problem is to be solved, the values $W2_a$ and $W3_a$ or $W2_n$ and $W3_n$ can be supplied to the computing means 120' by a suitable setting of the switches 180 and 182.

As shown in FIG. 9, the computing means 120' may include five multipliers 188, 190, 192, 194, an 196, each having two inputs and one output. One input of each multiplier receives a corresponding value W1, W2, W3, W4 and W5 supplied to the computing means 120'. The other input of each multiplier receives a corresponding coefficient $k1, k2, k3, k4$ and $k5$ supplied to the computing means 120'. The multipliers, thus, form the product of the value supplied and the coefficient supplied in each instance. The output signals of the multipliers are added up, by an adding circuit including four adders 98, 100, 102 and 104, to a new value, $W1_n$, which is available at the output of the adder 104 and, therefore, represents the output of the register stage 33'.

The code accompanying the value $W1_a$ passes through the multiplier 188 and the adders 98, 102 and 104, i.e., from the storage cell 114' of the register stage 33' holding the value $W1_a$ to the stage 43' receiving the new value $W1_n$. The code accompanying the value $W1_a$ is supplied also to a decoding unit 106 which, by decoding the code, determines the values of the coefficients $k1$, $k2$, $k3$, $k4$ and $k5$ and supplies corresponding coefficient output signals to the multipliers 188, 190, 192, 194 and 196. The decoding unit 106 may be any conventional programmable decoding unit, such as a magnetic core decoder or a memory addressable by the code. In addition to the code, the decoder 106 may also be supplied with the quantity $W1_a$, if the magnitude of the coefficient is made to depend on the magnitude of $W1_a$.

The switches 180 and 182 may be set by means of a signal "y" supplied from the outside. Alternatively, the signal "y" may be generated by the decoding unit 106. In this case, the code then contains at least one bit indicating in what position the switches 180 and 182 are to be set.

The operation of the computer can be accelerated by storing the code of the data unit shifted from the register stage 23' to the register stage 33' in a corresponding register 106a in the decoding unit 106, as well as in the storage cell 114' of the register stage 33'. The setting of the decoder will then take place simultaneously with the storing of information in the course of the shifting operation, and the values of the coefficients will be available for multiplication almost simultaneously with the data values.

In analogy to the extension of the present invention from two dimensions (see FIG. 2) to three dimensions (see FIG. 6), an extension to four or more dimensions is of course possible. In the general case of $n$ dimensions, each stage is connected to as many adjacent stages as an $n$-dimensional cube has faces, and there are $n - 2$ stacks of shift register planes. The number of stages provided with computing means will preferably be the same in all dimensional directions, to ensure uniform convergence in all dimensions. In the two-dimensional case, therefore, the part of the computer containing the diagonally staggered register stages provided with computing means is preferably square, and in the three-dimensional case there are just as many shift register planes as the square shift register planes have stages along one edge. The data may travel through all shift register planes in succession, as in FIG. 6, or only the shift register planes themselves actually concerned, which will then be in communication with each other only by way of the computing means.

It will be understood that the above-described embodiments are merely exemplary and that persons skilled in the art may make many variations and modifications without departing from the spirit and scope of the invention. For example, some of the stages of each row of the shift register may be replaced by an ultrasonic memory or a corresponding track of a magnetic drum memory or the like. Also, additional stages may be provided with computing means, such as stages 13, 24, 35, 46 and 57 and 41, 52, 63, 74 and 85 of the calculating device illustrated in FIG. 2. All such modifications and variations are intended to be included within the scope of the invention as defined in the appended claims.

We claim:

1. In a computer for numeric calculation of a plurality of functionally interrelated data units, each data unit corresponding to a point of a grid, the grid being arranged in rows and columns and covering a domain of solutions, using mathematical operations involving data units associated with grid points adjacent a preselected grid point and including a cyclic memory having at least as many storage cells as the grid has grid points, each storage cell storing a corresponding grid point data unit; means for storing information in at least one of the storage cells; shifting means for cyclically shifting cell-by-cell the information contained in the storage cells; a plurality of computing means, each computing means capable of being connected to more than one storage cell; and means for retrieving information from the cyclic memory when a calculation has been carried out, the improvement wherein:

each storage cell includes a first memory location for storing the corresponding grid point data unit and a second memory location for storing a code associated with the grid point data unit stored in the first memory location, the code containing information for controlling and processing the grid point data unit stored in the first memory location; and wherein each computing means is connected to a respective preselected storage cell and the storage cells storing simultaneously, at a predetermined time of each complete shift cycle, the grid point data units of grid points adjacent, in row and column direction of the grid, the grid point corresponding to said respective preselected storage cell at the predetermined time, each computing means being controlled by the code stored in the second memory location of said respective preselected storage cell for calculating a new grid point data unit for the grid point corresponding to said respective preselected storage cell using the grid point data units of the adjacent grid points.

2. A computer according to claim 1, wherein each code includes at least one labeling bit place for boundary value information specifying whether or not the grid point data unit is associated with a grid point located inside the domain of solutions; and wherein each computing means includes means controlled by the boundary value information for replacing in the first memory location of said respective preselected storage cell the grid point data unit stored in said respective preselected storage cell with the new grid point data unit only when the boundary value information indicates that the grid point corresponding to said respective preselected storage cell lies within the domain of solutions.

3. A computer according to claim 1, wherein each computing means includes a plurality of multipliers, one multiplier for each grid point data unit used to calculate the new grid point data unit, each multiplier having a data input for a respective grid point data unit, a coefficient input and a product output for generating a product output signal, each data input being connected to the first memory location of a respective storage cell which, at the time of calculation of the new grid point data unit, contains a grid point data unit used to calculate the new grid point data unit; a decoding unit, including a code input for receiving the code stored in the second memory location of one of said respective preselected storage cells and a plurality of coefficient outputs, each coefficient output being connected to a respective coefficient input of the multipliers, the decoding unit generating at the coefficient outputs, when the code is received by the decoding unit, coefficient signals corresponding to the information contained in the code; and circuit means connected to the outputs of the multipliers for forming a new grid point data unit from the product output signals of the multipliers.

4. A computer according to claim 3, further comprising a plurality of auxiliary shift registers, each auxiliary shift register having an input connected to the first memory location of one of the preselected storage cells and including at least as many storage cells as the number of storage cells of the cyclic memory between said one of the preselected storage cells and the following preselected storage cell in the direction of shift so that every storage cell of each auxiliary shift register corresponds to a storage cell of the cyclic memory; a pair of switch means associated with each auxiliary shift register, each switch means having a first input connected to a storage cell of its respective auxiliary shift register corresponding to a grid point adjacent the grid point corresponding to said one of the preselected storage cells, a second input connected to the storage cell of the cyclic memory corresponding to the storage cell of the auxiliary shift register connected to the first input, and an output connected to the data input of one of the multipliers of the computing means for said one of the preselected storage cells; and a source for a switching signal associated with each pair of switch means.

5. A computer according to claim 4, wherein each decoding unit generates the switching signal by decoding the code received at its respective code input.

6. A computer according to claim 1, wherein each computing means is connected to the storage cells for the two grid points most nearly adjacent, in each row and column direction, the grid point corresponding to said respective preselected storage cell.

7. A computer according to claim 1, wherein each computing means is connected to the storage cells for the grid points adjacent, in diagonal direction, the grid point corresponding to said respective preselected storage cell.

8. A computer according to claim 1, wherein each computing means is connected to a corresponding storage cell in two additional computers.

9. A computer according to claim 1, further comprising a dynamic memory, at least one of the storage cells of the cyclic memory being included in the dynamic memory.

10. A computer according to claim 1, further comprising a static memory, at least one of the storage cells of the cyclic memory being included in the static memory.

11. A computer according to claim 1, wherein the cyclic memory has an equivalent storage cell dimension for each dimension of a problem to be solved by the mathematical operations; and wherein the computing means for each preselected storage cell per dimension is connected to at least two storage cells for grid points which are adjacent, in the direction of dimension of the problem, the grid point corresponding to said respective preselected storage cell.

* * * * *

UNITED STATES PATENT AND TRADEMARK OFFICE
CERTIFICATE OF CORRECTION

PATENT NO. : 4,061,906                         Page 1 of 2
DATED      : December 6, 1977
INVENTOR(S): Wolfgang Grebe and Siegfried Buhlmann It is certified that error appears in the above-identified patent and that said Letters Patent are hereby corrected as shown below:

Column 2, line 14, "ajacent" should read --adjacent--;
Column 2, line 19, "containing" should read --contained--;
Column 2, lines 67 & 68, "peselected" should read --preselected--;
Column 3, line 27, "peselected" should read --preselected--;
Column 4, line 14, "hose" should read --whose--;
Column 4, lines 24 & 25, "$\underline{i}, \underline{j} + 1; - \underline{1}, \underline{j}; + \underline{1}, \underline{j};$ and $\underline{i}, \underline{j} -1$" should read -- $\underline{i}, \underline{j} + 1; \underline{i} - 1, \underline{j}; \underline{i} + 1, \underline{j};$ and $\underline{i}, \underline{j} - 1$--;
Column 4, line 28, "Dirichlet"s" should read --Dirichlet's--;
Column 4, lines 36 & 37, delete "of solutions.  In this manner, the grid points of the domain";
Column 5, line 4, "the" should read --an--;
Column 5, line 38, "16" should read --116--;
Column 5, line 54, after "way of" insert --a--;

UNITED STATES PATENT AND TRADEMARK OFFICE
CERTIFICATE OF CORRECTION

PATENT NO. : 4,061,906
DATED : December 6, 1977
INVENTOR(S) : Wolfgang Grebe and Siegfried Buhlmann It is certified that error appears in the above-identified patent and that said Letters Patent are hereby corrected as shown below:

Column 5, last line, "ading" should read --adding--;
Column 6, line 15, "115" should read --114--;
Column 7, line 5, before "locations" insert --memory--
Column 7, line 52, before "how" insert --and--;
Column 8, line 35, "43'" should read --43"--;
Column 8, line 48, "asscessible" should read --accessible--;
Column 8, line 62, "an 196" should read --and 196--; and
Column 10, line 32, "smultaneously" should read --simultaneously--.

Signed and Sealed this

Fourth Day of April 1978

[SEAL]

Attest:

RUTH C. MASON
Attesting Officer

LUTRELLE F. PARKER
Acting Commissioner of Patents and Trademarks